A. B. CADMAN.
SPEED INDICATOR DRIVING MECHANISM FOR RAILWAY CARS.
APPLICATION FILED MAY 22, 1911.
1,053,569.
Patented Feb. 18, 1913.
2 SHEETS—SHEET 1.
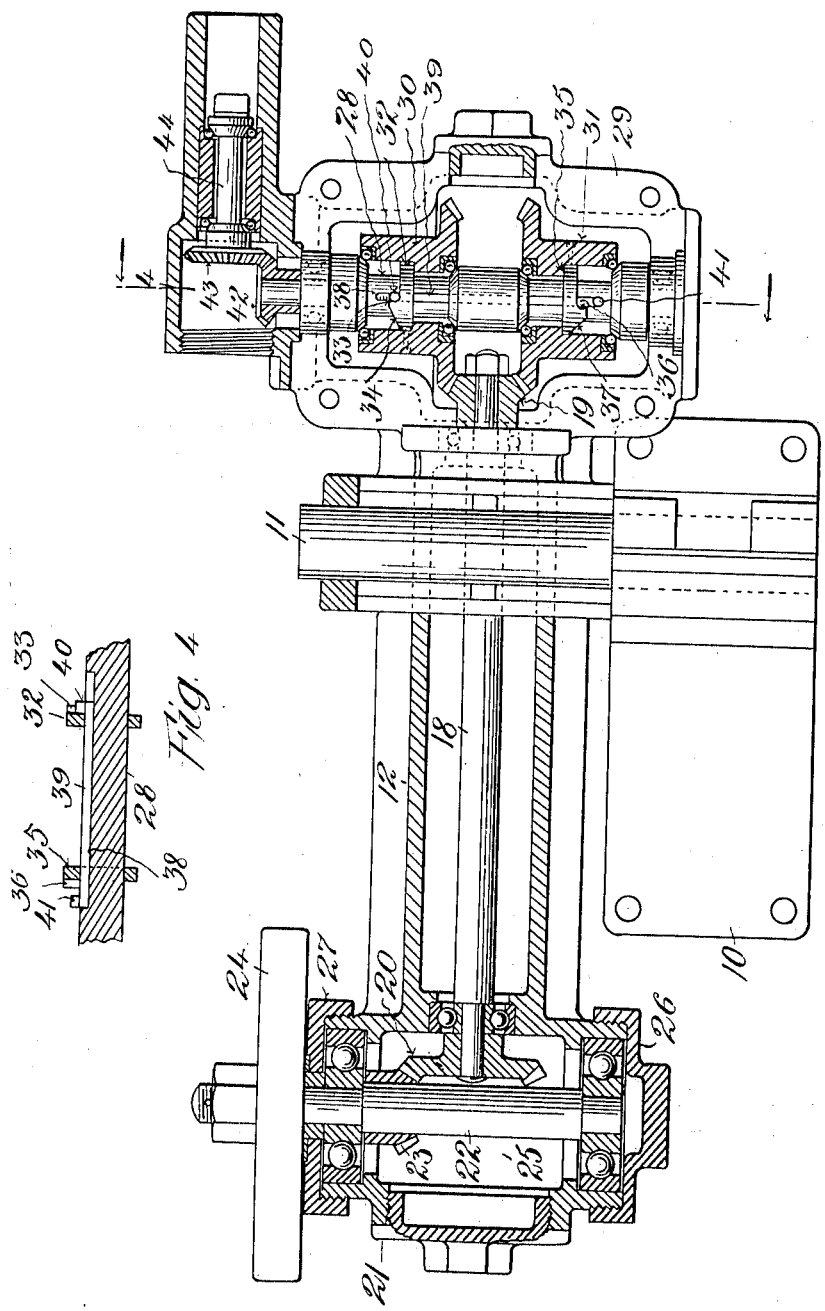
Witnesses:
Inventor
Addi Benjamin Cadman
By his Attorney

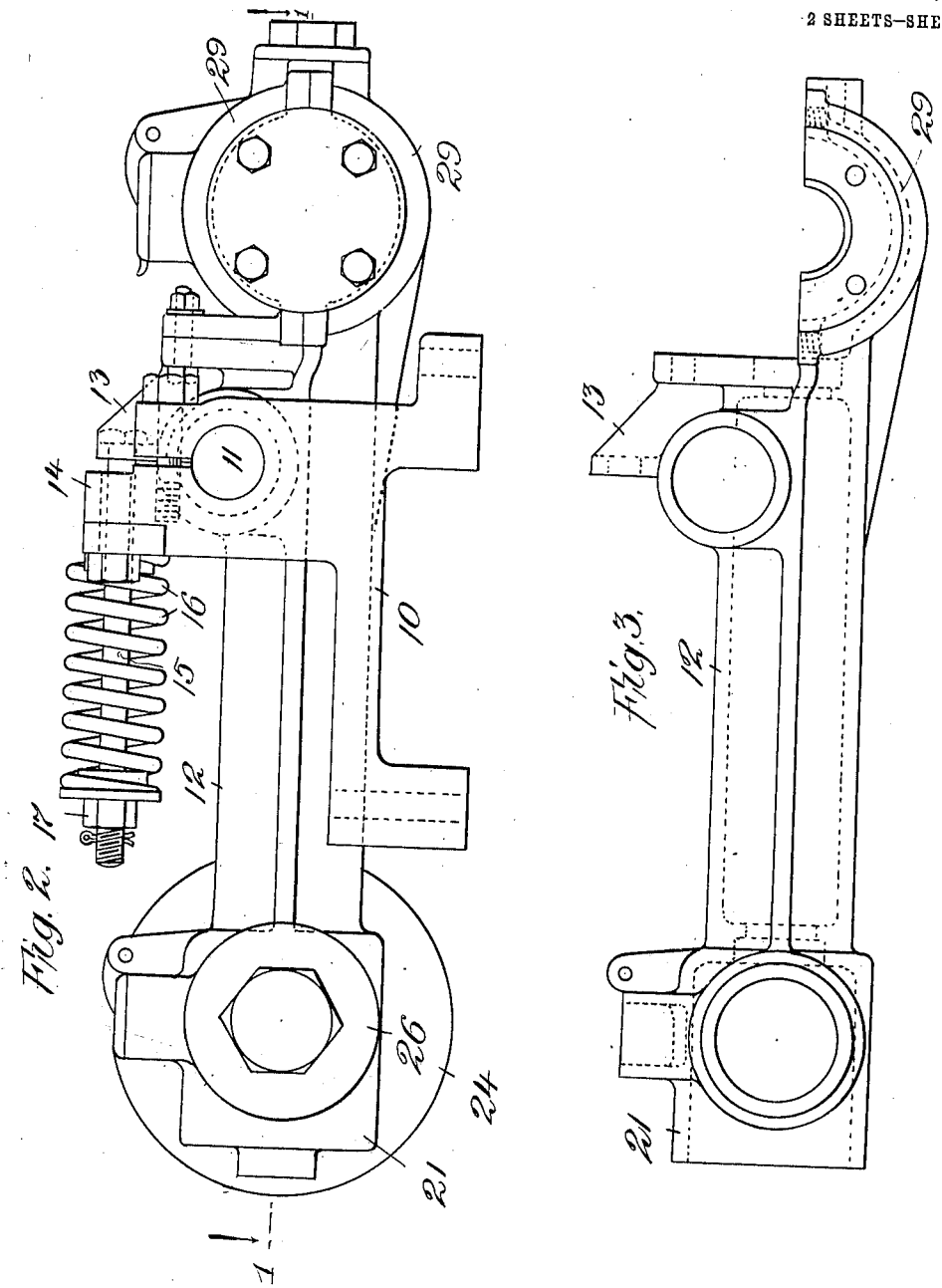

UNITED STATES PATENT OFFICE.

ADDI BENJAMIN CADMAN, OF BELOIT, WISCONSIN.

SPEED-INDICATOR-DRIVING MECHANISM FOR RAILWAY-CARS.

1,053,569.

Specification of Letters Patent. Patented Feb. 18, 1913.

Application filed May 22, 1911. Serial No. 628,869.

*To all whom it may concern:*

Be it known that I, ADDI BENJAMIN CADMAN, a citizen of the United States, residing at Beloit, in the county of Rock, State of Wisconsin, have made a certain new and useful Invention in Speed-Indicator-Driving Mechanism for Railway-Cars, of which the following is a specification.

This invention relates to drive mechanism for speed indicators, and particularly to apparatus employed for driving speed indicating and measuring devices to indicate or measure the speed of railway cars or other moving vehicles.

The object of the invention is to provide a drive mechanism of the character referred to which is simple in construction, durable, and capable of standing the rough usage imposed by the application thereof to railway cars or other similar moving vehicles.

A further object of the invention is to provide a drive mechanism of the character referred to which is constructed and arranged to drive the speed indicating or measuring instrument in continuous direction whether the car or other vehicle, to which the mechanism is applied, moves in one direction or the other.

A further object of the invention is to provide a drive mechanism of the character referred to adapted to be driven by peripheral contact of a drive wheel with the tread or other convenient surface of a truck-wheel of a car or other vehicle, and wherein reversal of direction of rotation of the truck or other wheel does not alter the continuous direction of operation of the speed or measuring instrument, and wherein means for accommodating the change in direction of rotation of the driving truck wheel, without change in direction of operation of the instrument to be driven, is accomplished in a simple manner and without complicated or easily deranged mechanical parts.

Other objects of the invention will appear more fully hereinafter.

The invention consists substantially in the construction, combination, location and relative arrangement of parts all as will be more fully hereinafter set forth, as shown in the accompanying drawings, and finally pointed out in the appended claims.

Referring to the accompanying drawings:—Figure 1 is a view in horizontal longitudinal section on the line 1—1 of Fig. 2, looking in the direction of the arrows, showing a construction embodying the principles of my invention. Fig. 2 is a view in side elevation of the same; Fig. 3 is a detail view in side elevation of the pivotally mounted supporting bracket employed in connection with my invention. Fig. 4 is a broken detail view in section on a plane indicated by 4—4 in Fig. 1.

The same part is designated by the same reference sign wherever it occurs throughout the several views.

In the operation of moving vehicles, such for instance as railway cars, engines, street-cars, and the like, it is desirable to provide means for indicating or measuring the speed at which the vehicle travels so as to disclose to the passengers, engineer, motorman or other person on a car or vehicle, the speed of the car, train or vehicle. In the application of speed indicating devices driven by connections to a moving part of the car or train it is evident that the drive mechanism for such instruments is subjected to rough and hard usage incident to the normal operation of the car, train, or vehicle. It is also necessary to provide such a construction that the speed indicating or measuring instrument shall be driven in continuous direction whether the car, train or vehicle moves in one direction or the other under operating conditions of service.

It is among the special purposes of my present invention to provide a drive mechanism for an instrument of the character referred to which is strong and durable, which is driven by a drive wheel arranged to bear against the tread or other suitable portion of a truck wheel, so as to be driven in one direction or the other according to the direction of travel of the train, car, or vehicle, but which operates devices for driving the indicator or measuring instrument in continuous direction whether the drive wheel is driven in one direction or another; wherein the engagement of the drive wheel against the truck wheel is yieldingly maintained, and wherein a simple and efficient device is employed having few mechanical parts, which are not liable to get out of order, for accommodating the reversals in direction of operation of the drive wheel without reversing the direction of operation of the indicating or measuring instrument.

It is also among the special purposes of my invention to provide a construction of drive mechanism of the character referred to which is capable of being readily and easily applied to or removed from the car, train, or vehicle, without interfering with the running gear of the vehicle, car or train, or without being interfered with by such running gear.

Referring to the accompanying drawings, 10 designates a supporting frame or member adapted to be bolted or otherwise secured upon a convenient part of the truck frame of a railway car or other vehicle, and arranged to carry a supporting pin 11. Upon the supporting pin 11 is pivotally mounted a bracket or frame 12 having an upwardly extending lug 13. The supporting member 10 is provided with a coöperating upwardly extending opposing lug projection 14. A bolt 15 is connected to the bracket lug 13 and works loosely through the lug 14 of the supporting member 10. A spring 16 is mounted on the bolt and arranged to bear at one end against the supporting member 10 or an extension thereof, and at the other end against an adjustable nut washer 17, mounted on said rod. The spring exerts its tension upon said rod to cause the bracket or frame 12 to be held yieldingly pressed in one direction of rocking movement upon its pivot 11. Suitably journaled in said frame or bracket 12, to extend longitudinally thereof, is a shaft 18 carrying oppositely presenting bevel gears 19—20 at the respective ends thereof. At one end the frame bracket 12 is formed into a casing 21 affording bearings for a shaft 22, arranged to extend at right angles to shaft 18, and having thereon a bevel-gear 23 meshing with gear 20 on shaft 18. The shaft 22 extends through the casing 21 and carries a drive gear 24 adapted to bear against the peripheral surface or other convenient portion of the truck wheel of the car or other vehicle to which the apparatus is to be applied. If desired and in order to inclose the chamber 25 of casing 21 the ends of said casing are provided with caps 26—27 suitably applied thereto and which serve to retain in place suitable ball bearings for the shaft 22 and also to exclude dust and dirt from the gearing inclosed within said chamber, the latter, at the same time, affording efficient means for lubricating the gearing referred to. If desired, and as shown, the shaft 18 may also be mounted in suitable or convenient ball bearings. At its opposite end the frame bracket 12 is provided with a bearing in which is mounted and suitably journaled a shaft 28 arranged to extend in a direction transversely of the shaft 18, the bearing cap member 29 serving to retain said shaft in its journal seat. Upon the shaft 28 are mounted to revolve loosely two oppositely faced bevel gears 30—31 both meshing with and being driven by the bevel gear 19 on shaft 18, which is placed intermediate the same. It is obvious from this description that the bevel gears 30—31 are simultaneously driven, but in opposite directions. The bevel gear 30 carries a collar 32 having a shoulder 33 bounded on one side by an inclined cam surface 34 which presents outwardly away from the gear face of bevel gear 30. Similarly, bevel gear 31 carries a collar 35 having a shoulder 36 which is bounded on one side by an inclined cam surface 37 the shoulder 36 and cam surface 37, being formed on the outer face of said collar and presenting outwardly away from the gear face of bevel gear 31. Thus the shoulders 33 and 36 and the cam surfaces 34—37 on the collars 32, 35, present in opposite directions with respect to each other, and said collars and their respective bevel-gears, are connected to revolve together and in opposite directions with respect to each other upon shaft 28. This shaft 28 is provided with a longitudinally extending slot or key way 38 in which is received an endwise shiftable key 39. This key is provided at its ends with laterally extending studs 40—41 respectively coöperating with the shoulders 33—36 of collars 32—35. The distance apart of the studs 40—41 is just sufficient to carry one of said studs out of engaging relation with respect to its associated shoulder on an adjacent collar when the other stud is in engagement with the shoulder upon its coöperating collar. Thus, in the arrangement shown in Figs. 1 and 4 the stud 40 is in engagement with shoulder 33 on collar 32, while the stud 41 has been shifted out of engaging relation with respect to the shoulder 36 on its associated collar 35.

From the foregoing description it will be seen that when the bevel gear 19 is rotated in the direction of the hands of a clock the shoulder 33 on collar 32 will engage pin 40, thereby rotating the shaft 28 through such engagement, while the gear 31 will simply run idly, the pin 41 having been shifted out of engaging relation with respect to shoulder 36. This is the condition of operation when the drive wheel 24 is driven in one direction, that is, when the car or train is moving in one direction. If this direction of movement of the car or other vehicle, is changed so as to drive wheel 24, and hence shaft 18, and bevel gear 19, in the opposite direction, or in a direction reverse to that of the travel of the hands of a clock, then the relative direction of rotation of bevel gears 30 and 31 is reversed. The first effect of this reversal is to cause the inclined cam surface 34 in the first reverse revolution of bevel gear 30, and its collar 32, to engage the pin 40 and shift the same laterally out of position to be engaged by shoulder 33; in other words, the pin 40 is shifted so as to permit the collar 32 to ride idly therepast. This shifting movement of pin 40, effected by the cam surface 34, causes the key 39 to be correspondingly shifted endwise in the slot or key-way 38, in shaft 28, and hence the pin 41 in the other end thereof is brought into engaging relation with, or position to be engaged by, the shoulder 36 on collar 35 which, as above explained, revolves in a direction opposite to that of collar 32 and gear 30. Similarly upon another reversal of direction of drive the cam surface 37 will engage pin 41 and shift the same and the key 39 back again to the position shown in Figs. 1 and 4, with the pin 40 in position to be engaged by shoulder 33. Thus the shaft 28 is driven in continuous direction, whatever may be the direction in which shaft 18, or its drive wheel 24, may operate, the shifting of the driving connections between gears 30—31 and shaft 28 being effected by the cam surface 34—37, and being accomplished during the first complete revolution of the gears 30—31, while changing directions.

The speed indicating instrument may be driven from shaft 28 in any suitable or convenient arrangement of gear connections. I have shown a simple arrangement wherein the shaft 28 carries a bevel gear 42 at its end arranged to mesh with a coöperating bevel gear 43 carried on a shaft 44 to which may be connected or coupled, in the usual or any convenient manner, the flexible or other shaft which drives the indicator or measuring instrument.

The various rotating parts may if desired, be provided with suitable or convenient ball-bearings in order to reduce the friction of operation thereof, but these and other details are not of material consequence, and may be altered or varied within a wide range without departure from, or affecting the scope of, my invention.

The bearing portion of the frame bracket 12 in coöperation with the cap member 29 of the bearing may serve to constitute an inclosed chamber for containing the gearing concerned in securing rotation of shaft 28 in continuous direction notwithstanding reversals of direction of the driving shaft. The chamber of this casing in which the gearing referred to is contained affords a convenient means for efficiently lubricating the gearing.

Many variations and changes in the details of construction and arrangement would readily occur to persons skilled in the art and still fall within the spirit and scope of my invention as defined in the claims.

It will be observed that the work to be performed by the drive gearing in driving the instrument is comparatively slight, since the instrument runs freely, and consequently the key 39 has but very little strain imposed thereon.

The construction above described provides an exceedingly simple and inexpensive mechanism for the purpose in view, and wherein the parts are few and not liable to derangement under the rough usage to which the apparatus may be put when applied in service operation on the railway cars or other vehicles, engines or the like.

Having now set forth the object and nature of my invention and a construction embodying the principles thereof what I claim as new and useful and desire to secure by Letters Patent is:—

1. In a drive mechanism of the character set forth, a shaft to be driven in continuous direction, a driving gearing therefor, adapted to be driven in opposite directions, and including oppositely faced and revolving gears mounted to revolve loosely on said shaft, a shiftable coupling member extending through said gears for coupling them to said shaft, and means located on the outer faces of said gears to engage said coupling members whereby the rotation of one of said gears in one direction shifts said coupling member out of engaging relation therewith and into engaging relation with the other of said gears.

2. In a mechanism of the character set forth, a shaft, and means for rotating the same in continuous direction including drive gearing operatable in opposite directions, said means including oppositely faced gears mounted to revolve loosely on said shaft in opposite directions, a shiftable coupling member for connecting one or the other of said gears to rotate with said shaft, said coupling member extending through said oppositely faced gears, means carried by the outer face of each gear for engaging said member to shift the same into and out of position to form a coupling for one or the other of said gears with the shaft, according to the direction of rotation of said gears.

3. In a drive mechanism of the character set forth, a shaft, having a key-way, a shiftable key operated therein, oppositely faced gears mounted to revolve loosely on said shaft in opposite directions, and through which said key extends, engaging means carried by each gear upon the outer face thereof and arranged to engage said key according to the direction of rotation of said gears, whereby when said key is shifted into position to be engaged by one of said gears it is shifted out of engaging relation with respect to the other of said gears.

4. In a drive gearing of the character set forth, a shaft having a key-way a slidable key mounted therein and having an engaging projection at each end, oppositely faced gears mounted to revolve loosely on said shaft in opposite directions, and through which said key extends, said gears on their outer faces having means coöperating with said projections to couple said gears to revolve with said shaft and means for shifting said projections, respectively, into and out of engaging relation with respect to said gears.

5. In a drive gearing of the character set forth, a shaft having a longitudinal key way, a shiftable key mounted therein, said key having its ends bent outwardly to form stop projections, oppositely faced gears loosely mounted to revolve in opposite directions upon said shaft, and having shouldered collars respectively placed outside the space between said gears, and coöperating with the key projections, and means for shifting said key projections, respectively, into and out of engaging relation with respect to their engaging shoulders.

6. In a drive gearing of the character set forth, a shaft, oppositely faced gears mounted to revolve loosely thereon in opposite directions, collars carried by said gears and located respectively outside the space between the gears and provided with shoulders on their outer faces, means extending through the gears and carried by the shaft and coöperating with said shoulders to couple said gears to said shaft and means whereby when said engaging connections are in engaging relation with respect to one of said collars it is shifted out of engaging relation with respect to the other of said collars.

7. In a drive gearing of the character set forth, a shaft, oppositely faced gears mounted to revolve thereon in opposite directions, a collar carried by each gear and provided with a shoulder and a cam surface, said collars being respectively located outside the space between the gears and engaging devices extending through the gears coöperating with said shoulders and cam surfaces, the cam surface of one collar operating to shift the engaging device into engaging relation with the shoulder on the other collar to couple the same to rotate with said shaft.

8. In a drive gearing of the character set forth, a shaft having a key-way, a shiftable key mounted therein and having lateral projections at its ends, oppositely faced gears mounted to revolve loosely in opposite directions on said shaft, a collar connected to rotate with each gear, each collar located outside the space between the gears and having a shoulder and an inclined or cam surface respectively coöperating with the lateral projection at the corresponding end of said key, the cam surface of one collar adapted to engage its associated key projection to shift the other key projection into engaging relation with the shoulder on the other collar.

In testimony whereof I have hereunto set my hand in the presence of the subscribing witnesses, on this 9th day of May, A. D., 1911.

ADDI BENJAMIN CADMAN.

Witnesses:
C. H. WARNER,
T. J. BURNS,
H. E. BLIVEN.